(12) United States Patent
Stellnert et al.

(10) Patent No.: US 7,926,449 B2
(45) Date of Patent: Apr. 19, 2011

(54) FLUID APPLICATION SYSTEMS AND METHODS AND MILKING SYSTEMS AND METHODS

(75) Inventors: Mats Stellnert, Farsta (SE); Mikael Gisslegard, Rönninge (SE); Stuart Wipperfurth, Cambridge, WI (US); Raymond Terwilleger, Plattsburg, MO (US)

(73) Assignee: DeLaval Holding AB, Tumba (SE)

( * ) Notice: Subject to any disclaimer, the term of this patent is extended or adjusted under 35 U.S.C. 154(b) by 849 days.

(21) Appl. No.: 11/768,093

(22) Filed: Jun. 25, 2007

(65) Prior Publication Data

US 2008/0314322 A1 Dec. 25, 2008

(51) Int. Cl.
- A01J 3/00 (2006.01)
- A01J 5/00 (2006.01)
- A01K 29/00 (2006.01)

(52) U.S. Cl. .................................. 119/670; 119/14.14

(58) Field of Classification Search ............... 119/14.05, 119/14.14, 670
See application file for complete search history.

(56) References Cited

U.S. PATENT DOCUMENTS

| | | | |
|---|---|---|---|
| 5,809,932 A | | 9/1998 | van den Berg |
| 6,584,930 B2 * | | 7/2003 | Buecker .................... 119/14.02 |
| 6,823,817 B2 * | | 11/2004 | van den Berg et al. .... 119/14.02 |
| 6,935,270 B2 | | 8/2005 | Wipperfurth et al. |
| 2004/0020440 A1 | | 2/2004 | Guo |
| 2007/0137580 A1 * | | 6/2007 | Brown et al. ............. 119/14.14 |

FOREIGN PATENT DOCUMENTS

| | | |
|---|---|---|
| EP | 0534565 A2 | 3/1993 |
| EP | 0945057 A1 | 9/1999 |
| EP | 1279326 A1 | 1/2003 |
| EP | 1279329 A2 | 1/2003 |
| GB | 2090431 A | 7/1982 |
| WO | 9811773 A1 | 3/1998 |
| WO | 9946978 A1 | 9/1999 |
| WO | 03055296 A1 | 7/2003 |

OTHER PUBLICATIONS

International Search Report issued in related PCT Patent Application Serial No. PCT/SE2008/050745 issued Jul. 10, 2008, 8 pages.

* cited by examiner

Primary Examiner — Timothy D Collins
Assistant Examiner — Monica Williams
(74) Attorney, Agent, or Firm — Lathrop & Gage LLP

(57) ABSTRACT

A fluid application system for automatically applying a fluid to the teats of an animal subsequent to the milking of the animal comprises a fluid delivery arrangement comprising a plurality of applicators, wherein each of the applicators is arranged in connection with a respective teat cup and is provided for applying the fluid to a teat of the animal, to which the respective teat cup is attached during the milking of the animal, in connection with a detachment of the teat cup from the teat. A control arrangement is provided for (i) determining, for a detachment of a teat cup from a teat, whether that detachment is a normal detachment or an abnormal detachment, and (ii) controlling, for the detachment of the teat cup from the teat, the applicator arranged in connection with that teat cup to apply the fluid provided that the detachment is a normal detachment and to not apply the fluid provided that the detachment is an abnormal detachment.

15 Claims, 4 Drawing Sheets

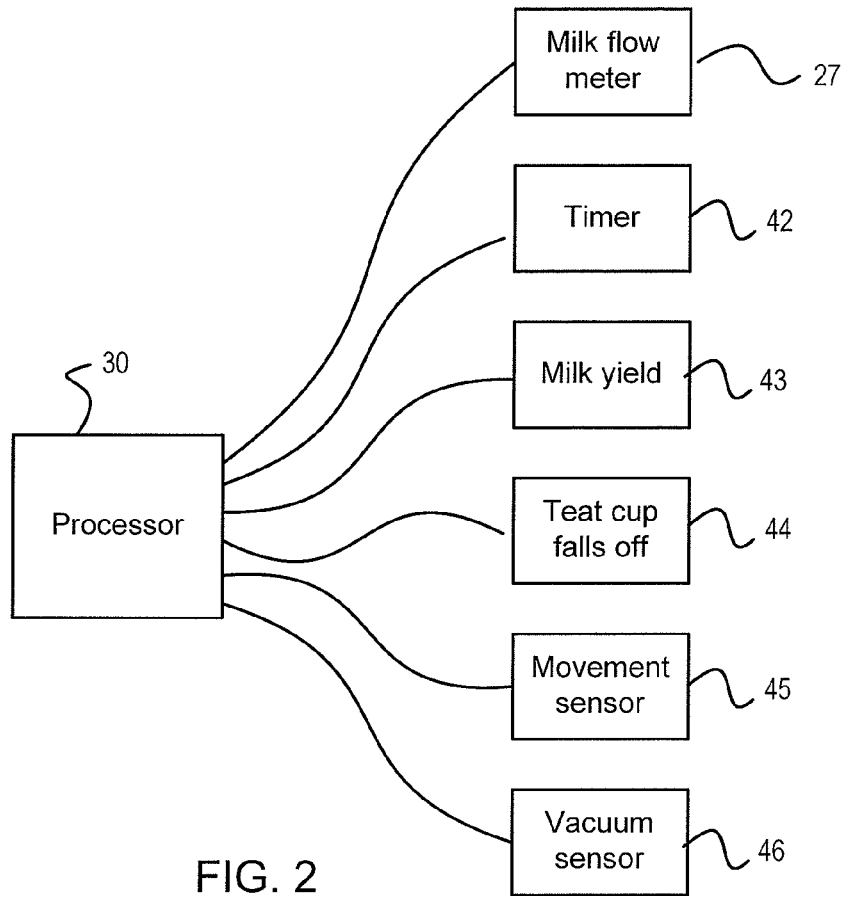
FIG. 2
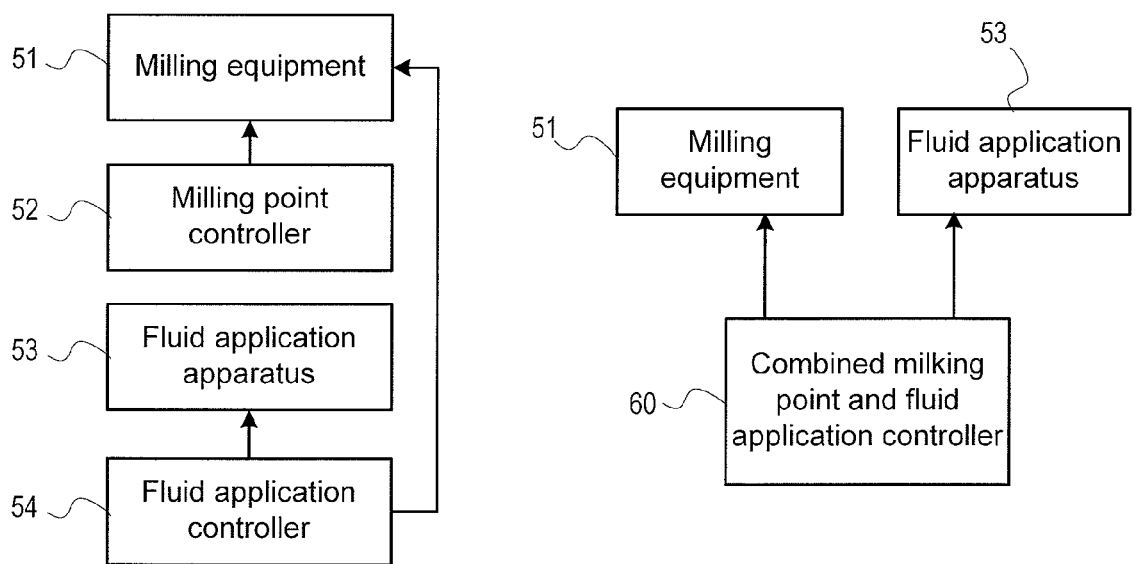
FIG. 3A
FIG. 3B

FLUID APPLICATION SYSTEMS AND METHODS AND MILKING SYSTEMS AND METHODS

FIELD OF THE INVENTION

The present invention is related generally to dairy farming.

BACKGROUND OF THE INVENTION

Cleaning, disinfecting, and/or protecting the teats of the animals is an important part in dairy farming. The use of disinfectant and/or skin conditioner can prevent the teats of the animals from becoming infected or dry, or otherwise affected by environment, e.g. dry, chapped, frost-bitten, etc.

It is standard practice in conventional systems where skin conditioner and/or skin disinfectant are applied manually using a cup-dipping (submersion) that the fluid it be applied within seconds of removal of the milking teat cup. The primary reason is that the teat orifice remains stretched and distended as a result of the pneumatic/mechanical action of milking. The application of fluid has better access to the convoluted tissue opening for germicidal or conditioning activity prior to the teat tissue regaining normal circulation under atmospheric conditions and subsequent involution of the teat orifice and streak canal. Additionally, the teat cistern's deteriorating residual vacuum can assist a droplet in coating the distal surfaces of the streak canal for more effective germicidal or conditioning activity.

U.S. Pat. No. 6,935,270 B2 discloses a milking and applicator teat cup configured to receive an animal teat within a liner located in a shell. At the openings of the liner and shell where the teat is received, there is an applicator configured to dispense disinfectant, conditioning, and/or cleaning solution to the animal teat. The applicator is designed to discharge the solution horizontally across the openings of the liner and the shell. Such a teat cup can be integrated into a milking system having a valve manifold coupled to a number of teat cups and controlling flow of milk from the number of teat cups and flow of fluid to the applicators, and a controller including logic configured to provide control signals to the valve manifold. The controller signals the valve manifold to pre-charge a hose or line delivering fluid to the applicator and signals the valve manifold for the end of milking and begin delivery of the fluid from the applicator.

SUMMARY OF THE INVENTION

In one embodiment of the disclosed processes and systems, in order to improve the applicator as disclosed in U.S. Pat. No. 6,935,270 B2, the solution is prevented from being discharged where an abnormal teat cup take off occurs. Thus, when the teat cup is then re-attached to re-establish milking since such milk may otherwise be contaminated by the discharged solution.

According to some embodiments, even if pre-charging is done initially when the programmable logic controllers determine that milking is progressing normally, solution is discharged at an abnormal teat cup take off at a later stage of milking.

If the detached teat cup is to be cleaned before being re-attached to the teat valuable time is lost, the work load is increased and so are the overall costs for milk production. In some markets pre-dipping is illegal and thus the teat cup cannot be re-attached to the teat even if it would be needed.

One aspect of embodiments of the disclosed processes is to provide an improved fluid application system for automatically applying a fluid to the teats of an animal subsequent to the milking of the animal by milking equipment.

Yet another aspect of embodiments includes providing a system and method which can control the fluid application procedure in a dynamic and flexible manner.

It is yet a further aspect of embodiments, the system is fully automated and can be coupled to a computer-based managing and control device for overall management of the animals on the farm.

In still further aspects, the disclosed system and method embodiments are exceptionally efficient, accurate, precise, flexible, fast, uncomplicated, reliable, of reasonable cost, and/or easy to implement and use.

The above mentioned attributes, among others, are attained by the disclosed systems and methods as specified in the appended claims.

According to one aspect of the disclosed embodiments a fluid application system is provided comprising a fluid delivery arrangement provided with a plurality of applicators, wherein each of the applicators is arranged in connection with a respective teat cup of milking equipment and is provided for applying the fluid to a teat of the animal, to which the respective teat cup is attached during the milking of the animal, in connection with a detachment of the teat cup from the teat. The fluid application system further comprises a control arrangement, which is arranged for determining, for a detachment of a teat cup from a teat, whether that detachment is a normal detachment or an abnormal detachment. The control arrangement finally controls, for the detachment of the teat cup of from the teat, the applicator arranged in connection with that teat cup to apply the fluid provided that the detachment is a normal detachment and to not apply the fluid provided that the detachment is an abnormal detachment.

In order to determine whether a detachment is a normal detachment or an abnormal detachment, the control arrangement may be connected to a number of sensors and apparatuses, which provide the control arrangement with data that can be used in the decision.

Such sensors and apparatuses may include, but are not limited to, a milk flow meter for repeatedly measuring a milk flow rate from the animal, a time measurement device for measuring a time lapsed from start of the milking of the animal, a milk yield measurement device for repeatedly measuring a milk yield as produced by the animal during the milking, and a device for detecting teat cup fall offs or slips during the milking of the animal, a device for detecting the movement of the animal during the milking, and a vacuum sensor for repeatedly measuring a vacuum level in the milking equipment during the milking.

By such a system, application of the fluid is avoided when an abnormal teat cup take off occurs, and the teat cup can be re-attached to the teat again to re-establish milking without the risk of contaminating the milk as collected or wasting fluid.

According to another aspect of the disclosed embodiments there is provided a method for automatically applying a fluid to the teats of an animal subsequent to the milking of the animal. According to the method it is determined, for a detachment of a teat cup from a teat, whether that detachment is a normal detachment or an abnormal detachment. For the detachment of the teat cup from the teat, the fluid is applied to the teat by an applicator arranged in connection with the teat cup provided that the detachment is a normal detachment, whereas no fluid is applied by the applicator provided that the detachment is an abnormal detachment.

A further aspect of these embodiments is to provide a milking system, which includes the above fluid application system, and such object is attained by milking systems as claimed in the appended patent claims.

Further aspects of the invention will be apparent from the following detailed description when taken in conjunction with the accompanying drawings.

BRIEF DESCRIPTION OF THE DRAWINGS

In the drawings:

FIG. 2 is a block diagram of a control arrangement in accordance with an embodiment of the invention as connected to sensors and apparatuses which provide the control arrangement with decision data.

FIGS. 3a-b are each a block diagram of a milking system provided with a fluid application system in accordance with a respective further embodiment of the invention.

In the following detailed description the animals are cows. However, the invention is not limited to cows, but is applicable to any animals having the capability of producing milk, such as sheep, goats, buffaloes, horses, etc.

DETAILED DESCRIPTION OF EMBODIMENTS

In reference to the drawings, a fluid application system in accordance with the invention is shown in conjunction with a portion of a milking system of the type utilized in automatic milking parlors.

Figure 1:
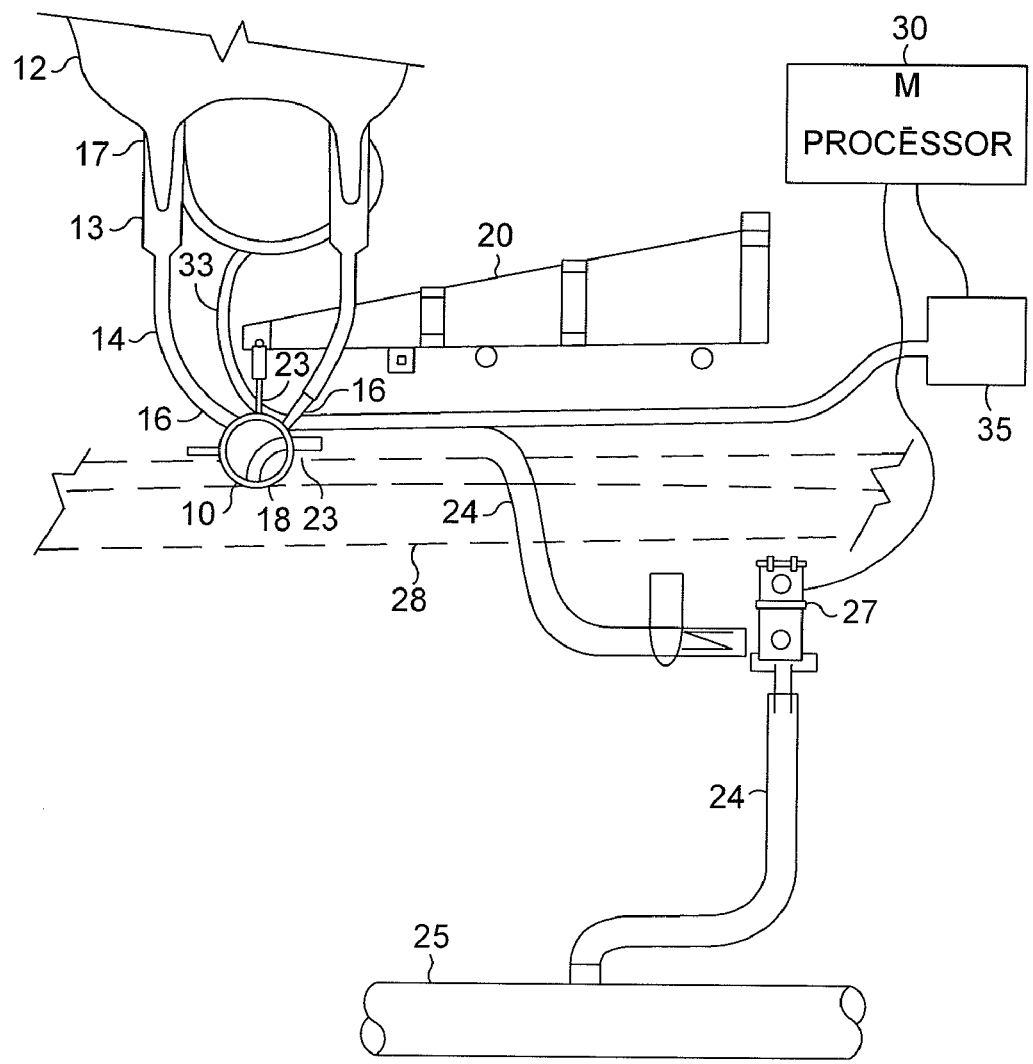
FIG. 1 is a simplified view of a portion of a milking system provided with a fluid application system in accordance with an embodiment of the invention.

The milking system shown in FIG. 1 is oriented in position for milking a cow 12 with teat cups 13 attached to the teats of the udder. It includes a side outlet milking claw for illustration purposes. In the system, the milk is directed from the liners of the teat cups 13 through flexible milk tubes or short milk hoses or tubes 14 through inlets 16 to a milking bowl 18 of a claw 10. The claw 10 is supported by a teat cup cluster support 20 that is connected to a hanger 21 of the milking claw. The milk exits from the bowl 18 of the claw through an outlet tube 23 to which a milk hose 24 is coupled. The milk hose 24 is connected to a milking pipe 25 that is under a milking vacuum so as to draw the milk from the milk hose 24 into the milk pipe 25. For purposes of illustration, a milk flow sensor 27 is shown in connection with the milk hose 24 to sense a milk flow rate and provide an indication when the cow has been milked completely so that the teat cups 13 may be automatically detached from the cow.

The milking system comprises a fluid application system for automatically applying a fluid such as a disinfectant and/or conditioning solution to the teats of the cow 12 subsequent to the milking of the cow 12. Such procedure is also referred to as a post-dip. The fluid application system comprises a plurality of applicators 17, each being arranged in a respective teat cup 13 near the opening of the teat cup 13 that receives the cow teat. The applicator 17 dispenses disinfectant and/or conditioning solution onto the teats of the cow after milking as the teat cup 13 descends from the teat. The solution dispensed by the applicator 17 is received from a fluid hose 31 via a solution delivery line 33. The solution delivery line 33 is preferably connected to a large container 35 of conditioning and/or disinfectant solution.

Exemplary embodiments of the milking teat cup and applicator arrangements, which can be used in the present invention after suitable modifications, are illustrated and disclosed in detail in U.S. Pat. No. 6,935,270 B2, the contents of which being hereby incorporated by reference.

The fluid application system further comprises a control arrangement 30 provided for determining, for each detachment of a teat cup 13 from a respective teat of the cow 12, whether that detachment is a normal detachment or an abnormal detachment. To this end the control arrangement 30 is in the embodiment of FIG. 1 connected to the milk flow sensor 27 to receive repeatedly measured milk flow rate values during the milking of the cow. The control arrangement 30 may then determine whether a detachment is a normal detachment or an abnormal detachment depending on the repeatedly measured milk flow rate values.

Generally, an abnormal detachment is defined as a detachment prior to the normal end of milking caused by an unforeseen event such as a teat cup fall off. Typically, but not necessarily, an abnormal detachment is followed by a re-attachment of the teat cup to the teat for further milking of that teat.

For instance, the control arrangement 30 may be provided for determining that a detachment is an abnormal detachment provided that the repeatedly measured milk flow rate falls below a first threshold value during a first measured time period, that is, the repeatedly measured milk flow rate falls sufficiently fast, which is the case for a sudden abnormal teat cup detachment such as a teat cup fall off. At normal end of milking the repeatedly measured milk flow rate falls less steep.

Finally, the control arrangement 30 is provided, for each detachment, to control the flow of fluid to the applicators 17, in particular the applicator arranged in connection with that teat cup, to apply the fluid if the detachment is a normal detachment and to not apply the fluid if the detachment is an abnormal detachment.

Hereby, considering that a teat cup will normally be re-attached to the teat of the cow subsequent to an abnormal teat cup detachment, no fluid is dispensed in the teat cup 13. Thus there is no risk of contaminating the milk collected via the milk hose 24 and the milking pipe 25.

Particularly, but not necessarily, the above measures may be taken on an udder individual level only. In such instance, the control arrangement 30 is provided, for each detachment, to control the flow of fluid to the applicators 17 to apply the fluid to all teats of the cow in connection with take-off if the detachment is a normal detachment and to not apply the fluid to any of the teats if the detachment is an abnormal detachment.

The decision whether application of fluid should be applied or not on a teat individual level may be made by using a milking system with separate milk collection equipment for each teat or udder quarter such as the DeLaval voluntary milking system VMS a system which has been made commercially available in the United States from DeLaval, Inc. by and through its regional office in Kansas City, Mo.

Alternatively or additionally, the control arrangement 30 may be connected to other sensor and apparatuses, which provide the control arrangement 30 with data that can be used in the decision as to whether a teat cup detachment is a normal detachment or an abnormal detachment.

FIG. 2 shows a control arrangement 30 in accordance with an embodiment of the invention as connected to sensors and devices, which provide the control arrangement 30 with decision data. Generally, the control arrangement 30 may receive measurement values from a plurality of the sensors arranged in connection with the milking equipment and/or the cow. The received measurement values are input as parameters in a decision algorithm, which is run, and an abnormal detachment of the teat cup from the teat is detected depending on the result from the decision algorithm.

The sensors and devices comprise except for the milk flow meter 27, a time measurement device or timer 42 provided for measuring a time elapsed from start of the milking of the cow. If the lapsed time is below a second threshold value, this could point towards that the teat cup detachment is an abnormal detachment, whereas if the lapsed time is above a third threshold value, this could points towards that the teat cup detachment is a normal detachment. The second and third threshold values could be identical, but to obtain more certain observations the third threshold is preferably higher than the second threshold value. If the lapsed time is between the second and third threshold values no establishment whether the teat cup detachment is a normal or abnormal detachment can be made. If this timer 42 is combined with other sensors and devices, an elapsed time between the second and third threshold values could indicate that the decision algorithm does not take the elapsed time into account.

Further, the control arrangement 30 is connected to a milk yield measurement device 43 provided for repeatedly measuring a milk yield as produced by the cow during the milking. If measured milk yield is below a fourth threshold value, this could point towards that the teat cup detachment is an abnormal detachment, whereas if the measured milk yield is above a fifth threshold value, this could point towards that the teat cup detachment is a normal detachment. The fourth and fifth threshold values could be identical, but to obtain more certain observations the fifth threshold is preferably higher than the fourth threshold value. If the milk yield measurement device 43 is combined with other sensors and devices, a measured milk yield between the fourth and fifth threshold values could indicate that the decision algorithm does not take the milk yield into account.

Yet further, the control arrangement 30 is connected to a device 44 provided for detecting teat cup fall off during the milking of the cow, wherein the control arrangement 30 is provided for determining whether the detachment is a normal detachment or an abnormal detachment depending on the detection of teat cup fall off. A sudden teat cup fall off could be an indication of an abnormal teat cup detachment in contrary to a normal detachment which is much slower. The device 44 may e.g. be an accelerometer based device.

Still further, the control arrangement 30 is connected to a device 45 for measuring the activity or movement of the cow during the milking thereof, and the control arrangement 30 is provided for determining whether the detachment is a normal detachment or an abnormal detachment depending on the detected activity or movement during the milking. A high activity or large or many movements could be an indication of an abnormal teat cup detachment.

Yet further, the control arrangement 30 is connected to a device 46 for repeatedly measuring the vacuum level in the milking system during the milking of the cow and the control arrangement 30 is provided for determining whether the detachment is a normal detachment or an abnormal detachment depending on the repeatedly measure vacuum level in the milking system. A very fast vacuum drop could point towards an abnormal teat cup detachment, whereas a slower vacuum drop could point towards a normal teat cup detachment. Likewise the above time measurement and milk yield measurement devices, it is possible to set threshold values for vacuum levels which can be used to determine normal/abnormal detachment.

It shall be appreciated that the control arrangement 30 may determine whether a teat cup detachment is a normal detachment or an abnormal detachment based on results from some or all of the sensors and apparatuses as illustrated in FIG. 2. Further, sensors and apparatuses to be used in the present invention may be readily contemplated by a person skilled in the art.

For instance, devices for measuring air inlets into the milking equipment and devices for measuring milk slugs in the milking equipment are examples of further devices usable in the present invention. These devices may for instance be based on optical instruments.

If the control arrangement 30 determines that an abnormal teat cup detachment has taken place, no fluid is dispensed through the applicators 17. The cluster is removed and the control arrangement 30 may then signal to the dairy farmer that an abnormal teat cup detachment has been made.

The dairy farmer may continue the milking operation in a number of manners which include inter alia the following:

Re-attach the cluster and continue milking in automatic mode. The fluid application system may be enabled or disabled.

Re-attach the cluster and continue milking in manual mode. The fluid application system may be enabled or disabled.

Re-attach the cluster and immediately perform a normal take off to thereby trigger the fluid application system to apply fluid to the teats.

Interrupt milking and manually apply the fluid to the teats.

It shall be appreciated that the control arrangement 30 can be provided, for each detachment of a teat cup from a teat of a selected cow, for controlling the applicators to not apply the fluid irrespective whether the detachment is a normal detachment or an abnormal detachment.

The selected cow may be a cow that usually creates a problem, such as teat cup kick off, etc. or a cow that needs to be treated after milking. Such cow may be tagged in the control arrangement 30 to not be post-dipped automatically and when this cow has entered a specific stall the milking system management device will communicate to the control arrangement 30 that this cow is tagged as a "no post-dip" cow and then the control arrangement 30 turns off the applicator system automatically so that no fluid will be applied at teat cup detachment. This process of turning the applicator system off at the control device 30 may also be performed manually by the operator through a user interface provided for such.

It shall further be appreciated that the fluid delivery arrangement contains two valves, preferably solenoid type valves, connected in series to provide a failsafe delivery arrangement in order to prevent applying of fluid if one of the two valves fails. The valves are preferably spring loaded valves that default to the closed position and must be energized to open.

This block-bleed-block safety is a redundancy to minimize the risk of the fluid such as post-dip contaminating the milk due to a valve failure. It reduces the risk that the fluid never enters the milk due to a coil failure. The fluid delivery arrangement may contain separate lines for delivery of the fluid, water, and air to the teat cups. In such arrangement a valve manifold may contain four valves, one for the delivery of each of the fluid, water, and air and one safety valve that is connected in series with each of the other valves.

This additional safety valve needs to be energized for the fluid or water or air to actually be supplied to the cluster. If, for instance, the fluid valve fails in an open position the fluid will be ejected from the valve manifold and to a safe place where it will not contaminate the milk. The fluid will only be supplied to the cluster when both the fluid and the safety valve are open.

The control arrangement 30 could also be used in some specific applications, e.g. when group back flush is not suitable such as in rotary milking parlors, for the control of teat cup cleaning, such as a back flush procedure.

With reference next to FIGS. 3a-b two different milking systems, each provided with a fluid application system in accordance with a respective further embodiment of the invention, are disclosed.

FIG. 3a illustrates a milking system having, for each of a plurality of milking positions or stalls, milking equipment 51 for milking an animal, a milking stall controller 52 for controlling the milking of the animal by the milking equipment, a fluid application apparatus 53 as has been described above, and a stand-alone fluid application controller 54, which may be identical with the control arrangement 30 as has been described above. In a preferred version, however, the milking stall controller 52 is arranged for determining whether a detachment of a teat cup is an abnormal or a normal teat cup detachment and this information is transferred to the stand-alone fluid application controller 54, which controls the fluid application.

If the fluid application apparatus 53 is disabled the stand-alone fluid application controller 54 is at standby, and the milking equipment 51 is operated under the control of the milking stall controller 52 as in a conventional milking system which lacks an automatic fluid application apparatus.

If the fluid application apparatus 53 is enabled, the stand-alone fluid application controller 54 may take over the control of the milking equipment 51 in connection with the detachment of a teat cup, which includes vacuum control at end of milking (i.e. switching off the vacuum) and teat cup removal control. The application of the fluid has to be synchronized with teat cup detachment and therefore the milking stall controller 52 is by-passed, and the fluid application controller 54 controls both the milking equipment 51 and the fluid application apparatus 53.

In other versions of the embodiment, the stand-alone fluid application controller 54 (i) only takes over the control of the switching off of the vacuum, (ii) only takes over the control of the teat cup take-off, or (iii) does not take over any of the duties from the milking stall controller 52. In the latter case the two controllers are timed to work properly with one another.

Such fluid application apparatus with a stand-alone fluid application controller is suitably implemented in existing milking systems lacking any kind of fluid application capabilities.

Teat cup cleaning, such as a back flush procedure may be performed under the control of either the milking stall controller or the fluid application controller or other stand-alone controller.

FIG. 3b illustrates a milking system having, for each of a plurality of milking stalls, milking equipment 51 for milking an animal, a fluid application apparatus 53 as has been described above, and a combined milking stall and fluid application controller 60, which controls both the milking equipment 51 and the fluid application apparatus 53 at all instants.

Such fluid application apparatus with a combined milking stall and fluid application controller 60 is suitably implemented in novel milking systems.

It shall further be appreciated that in an alternative embodiment, the control of the milking equipments of the milking stalls and/or the control of the fluid application apparatuses of the milking stalls may be performed by a common control system or apparatus.

Figure 4:
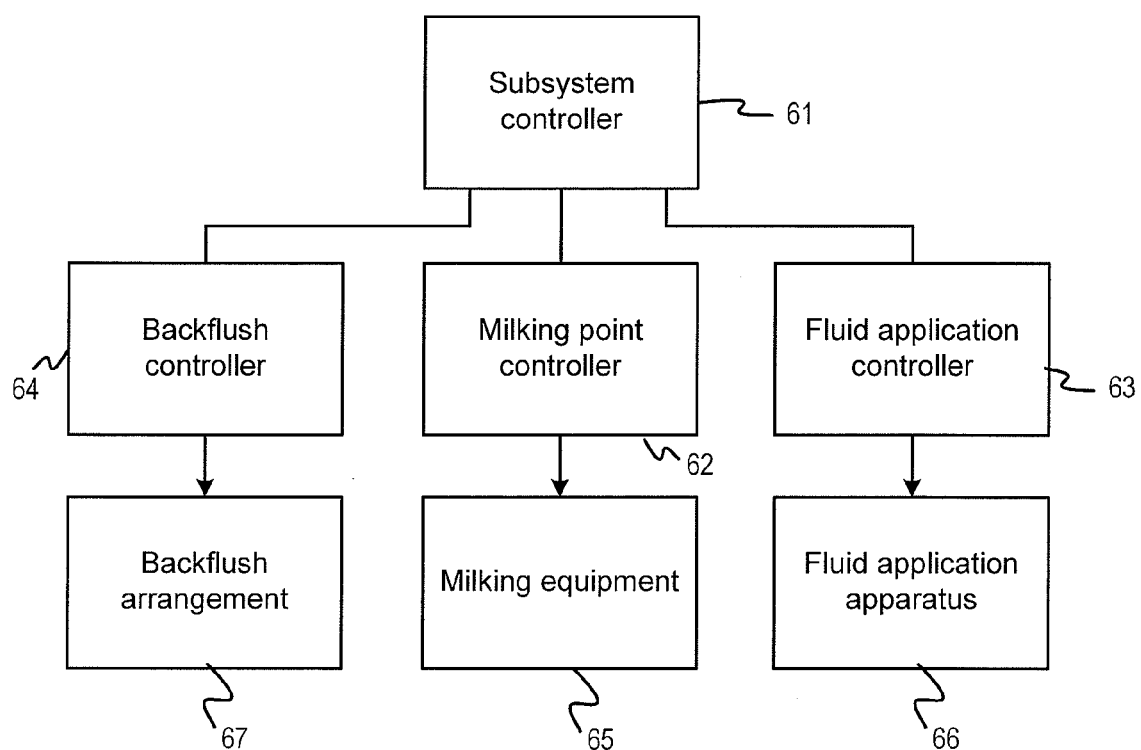
FIG. 4 is a block diagram of a milking system in accordance with a yet further embodiment of the invention.

With reference next to FIG. 4 a milking system is schematically illustrated, which comprises a subsystem controller 61, which may be connected to a herd management system (not illustrated) and is responsible for the overall control of the milking system. The subsystem controller 61 is operatively connected to three controllers, a milking stall controller 62, a fluid application controller 63, and a back flush controller 67. The milking stall controller 62 is provided for the control of milking equipment 65 of a milking position, the fluid application controller 63 is provided for controlling a fluid application apparatus 66 of a milking position, e.g. the fluid application apparatus of the present invention, the fluid application apparatus of U.S. Pat. No. 6,935,270 B2, or any other fluid application apparatus that applies a fluid to the teats of the cows within teat cups, and the back flush controller 67 is provided for controlling a back flush arrangement or other kind of cleaning arrangement for the cleaning of the teat cups at a milking position between each milking. Typically, the milking stall controller 62, the fluid application controller 63, and the back flush controller 67 operate under the control of the subsystem controller 61.

The milking system may comprise only one subsystem controller 61, whereas the number of each of the other arrangements and apparatuses may correspond to the number of milking positions in the milking system.

It shall though be appreciated that the milking stall controller 62 and the fluid application controller 63 may be integrated into a single device.

Further, the back flush controller 64 may be integrated with the milking stall controller 62 and/or the fluid application controller 63.

Still further, the subsystem controller 61 may control each of the back flush arrangements 67 directly and in such instance the back flush controllers 64 may be dispensed with.

A problem with a system having both a fluid application apparatus and a teat cup cleaning arrangement such as the back flush arrangement 67 is that if the teat cup cleaning arrangement is disabled for some reason, the fluid application apparatus will apply a fluid to the teats of the cow in the teat cups subsequent to milking, and the fluid will not be removed before a next cow is to be milked. As a result the milk may be contaminated.

According to the embodiment of FIG. 4 this is solved by operatively connecting the back flush controller and the fluid application controller together, directly or via other apparatus, such as the subsystem controller 61, in such a manner that the operation of the automatic fluid application apparatus is never enabled simultaneously as the operation of the automatic fluid application apparatus is disabled.

Particularly, if the fluid application controller is arranged to enable the automatic fluid application apparatus, the back flush controller is arranged to automatically enable the back flush arrangement, and/or if the back flush controller is arranged to disable the back flush arrangement, the fluid application controller is arranged to automatically disable the automatic fluid application apparatus.

Hereby, it can be guaranteed that the teat cup cleaning arrangement is enabled if the fluid application apparatus is enabled, and as a result the teat cups will always be cleaned after the application of the fluid.

If the subsystem controller controls each of the back flush arrangements directly (in which instance the back flush controllers are dispensed with) the status of the fluid application controllers may be monitored by the subsystem controller to thereby establish if at least one of the fluid application controllers have controlled its fluid application apparatus to dispense fluid. If now an operator attempts to disable the back flush function, the subsystem controller will not allow the back flush to be disabled until the cluster contaminated with the dispensed fluid has been back flushed (or manually cleared by the operator). If no fluid applications have occurred at the time of the attempted back flush disable, the subsystem controller allows the back flush to be disabled.

Figure 5:
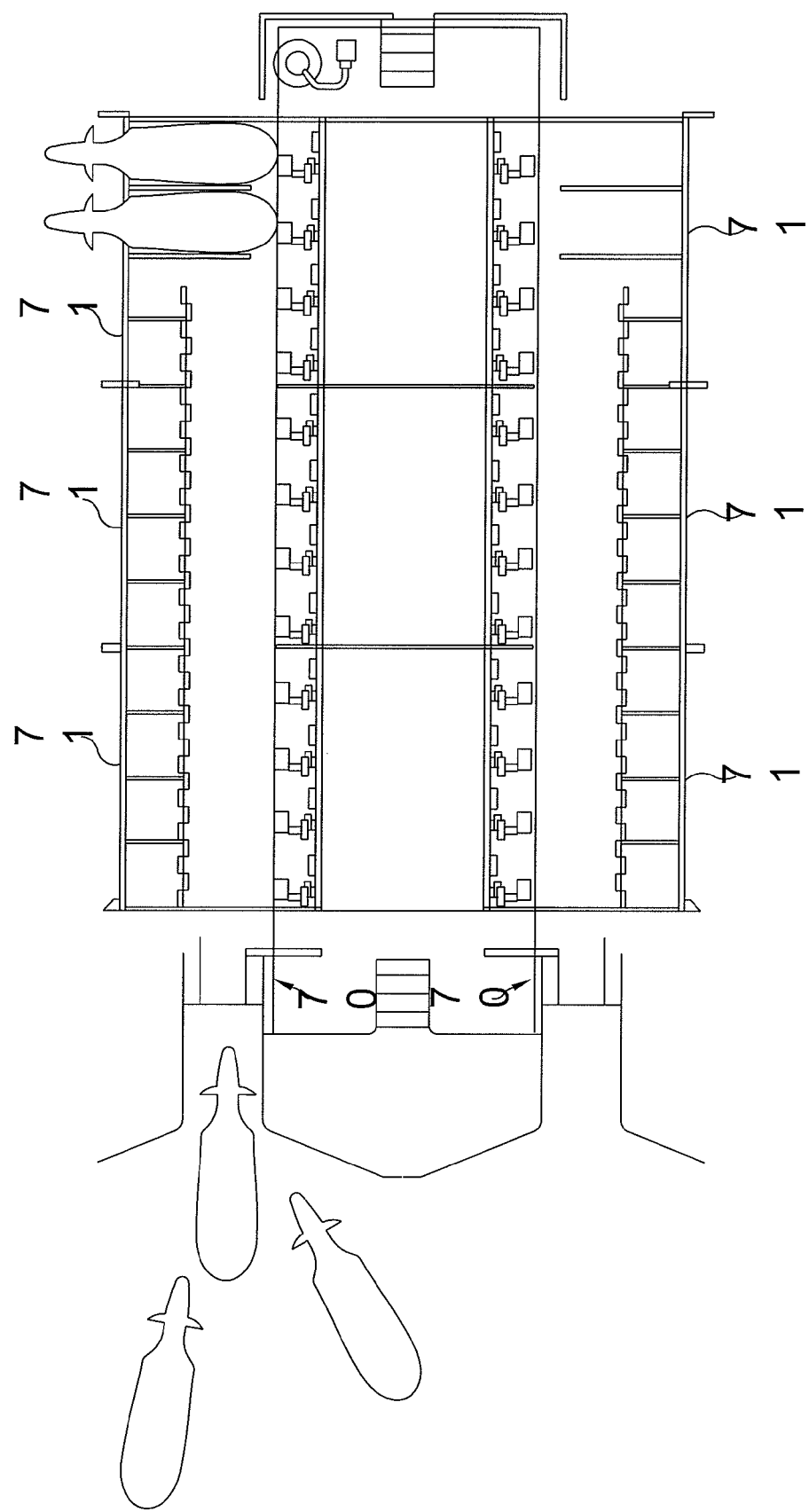
FIG. 5 is a schematic top view of a milking system in accordance with a still further embodiment of the invention.

With reference next to FIG. 5, which is a schematic top view of a milking system, a still further embodiment of the invention will be described. The milking system is of a parallel stall type with two rows of twelve milking positions. The milking system comprises two entrance gate arrangements 70, one for each row, and six exit gate arrangements 71, one for each group of four adjacent milking positions. Each of the two entrance gate arrangements 70 comprises an identification device to identify the cows as they sequentially enter each of the rows of the milking system. Further, a respective movable crowd gate may be provided at each of the rows of the milking system. The milking system comprises one subsystem controller, a back flush or other kind of teat cup cleaning apparatus, and for each milking stall milking equipment including a cluster and teat cups, a fluid application apparatus, a cluster detachment apparatus, and a controller for the milking equipment and the fluid application apparatus (not explicitly illustrated). The progress of the milking is monitored manually and as the milking is terminated the exit gate arrangements 71 are opened in response to a manual command by the dairy farmer.

A problem with a prior art milking system of the above kind is that it is labor intensive and the time required for one milking cycle is too long. Particularly, the monitoring of the progress of the milking and the manual operation of the exit gate arrangements 71 are labor intensive. Further, the time elapsed between the end of the last cow in a group completing milking until the opening of the exit gates is too long.

Such shortcoming or limitation is solved by the operation of the FIG. 5 embodiment as will be seen.

A milking cycle is performed as follows, starting with cows present at the milking positions:

1. The dairy farmer prepares a cow at each milking position and attaches the cluster to the cow.
2. Each prepared cow is milked by the milking equipment under the control of the milking stall controller. The initiation of the automatic milking procedure is initiated by the dairy farmer at the end of preparation.
3. After the milking is terminated for each cow the milking stall controller controls the cluster detachment apparatus to detach the cluster.
4. During the detachment the milking stall controller controls the fluid application apparatus to apply fluid to the teats of the cow, i.e. performing a post-dip. When the post-dip is made at a milking stall an all set signal is sent from the milking stall controller to the subsystem controller.
5. The subsystem controller collects the all set signals from the milking stall controllers and when all set signals have come from all milking stall controllers at a group of milking stalls having a common exit gate arrangement 71, the subsystem controller controls this exit gate arrangement 71 to automatically open and allow the cows at these milking stalls to leave the milking system.

This is very advantageous since the dairy farmer does not need to monitor the milking progress manually, but is capable of performing other duties. The opening and closing of the common exit gate arrangements 71 are performed entirely automatically.

Further, some of the cows that will leave the milking system slowly may belong to those that are admitted to leave the milking system early. As a result the time required for all the cows to leave the milking system will in average be significantly shortened.

6. When the subsystem controller has received an all set signal from each of the milking stall controllers of the milking system the subsystem controller controls the teat cup cleaning arrangement to clean all teat cups at all milking stalls.
7. When all cows have left the milking system the subsystem controller controls all exit gate arrangements to close.
8. The subsystem controller controls the entrance gate arrangement to open and to allow a new batch of cows to enter the milking system.
9. If crowd gates are present, the subsystem controller will control the crowd gates to move forward to thereby force the cows to enter the milking system.
10. The identities of the cows that enter the rows of milking system are recorded by the subsystem controller.
11. When a row is full as detected by counting the identities recorded, the subsystem controller controls the entrance gate arrangements of that row to close.

The cycle is ended here, and the milking procedure starts with step number 1 as listed above.

The above milking procedure will tremendously reduce the labor required in the parlor and increase the efficiency with number of turns/hour.

It shall be appreciated that the above milking procedure is applicable to milking systems having a common exit gate for each row of milking stalls and to milking stalls having an exit gate of each single milking stall. In the latter case, the subsystem controller collects the all set signals from the milking stall controllers and for each all set signal the subsystem controller controls the exit gate of the corresponding milking stall to open and allow the cow at the milking stall to leave the milking system. Hereby, each of the cows is allowed to leave the milking system when the cow has been post-dipped.

What is claimed is:

1. A fluid application system for automatically applying a fluid to the teats of an animal subsequent to the milking of said animal by milking equipment, said system comprising:

a fluid delivery arrangement comprising a plurality of applicators, each of the applicators corresponding to a respective teat cup of said milking equipment for applying said fluid to a teat of the animal; and a control arrangement for determining whether a detachment of each teat cup from the teat of the animal is a normal detachment or an abnormal detachment;

wherein said control arrangement has a first configuration in which: (a) each applicator is respectively actuated to apply said fluid provided that the detachment of the corresponding teat cup is a normal detachment, and (b) each applicator is respectively not actuated to apply said fluid when the detachment of the corresponding teat cup is an abnormal detachment; and wherein said control arrangement has a second configuration in which at least one applicator is not actuated to apply said fluid upon a detachment of the corresponding teat cup irrespective of whether the detachment is a normal detachment or an abnormal detachment.

2. The system of claim 1 wherein said control arrangement is connected to a milk flow meter provided for repeatedly measuring a milk flow rate from the animal during the milking, and said milk flow rate is used in determining, for the detachment of a teat cup from a teat of the animal, whether the detachment is a normal detachment or an abnormal detachment.

3. The system of claim 2 wherein said control arrangement recognizes that the detachment is an abnormal detachment provided that said repeatedly measured milk flow rate falls below a first threshold value during a first measured time period.

4. The system of claim 1 wherein said control arrangement is connected to a time measurement device which is adapted to measure a time lapse from start of the milking of the animal to the time of detachment, said time lapse used by said control arrangement in determining, for a detachment of a teat cup from a teat of the animal, whether the detachment is a normal detachment or an abnormal detachment.

5. The system of claim 4 wherein said control arrangement determines, whether said detachment of the teat cup from the teat of the animal is an abnormal detachment if said lapsed time is below a second threshold value.

6. The system of claim 1 wherein said control arrangement is connected to a milk yield measurement device provided for repeatedly measuring a milk yield as produced by the animal during the milking, and for determining whether the detachment is a normal detachment or an abnormal detachment depending on said repeatedly measured milk yield.

7. The system of claim 6 wherein said control arrangement determines whether said detachment is an abnormal detachment when said repeatedly measured milk yield is below a third threshold value.

8. The system of claim 1 wherein said control arrangement is connected to a device provided for detecting teat cup fall off during the milking of the animal, and said control arrangement detects whether the detachment is a normal detachment or an abnormal detachment depending on said detection of teat cup fall off.

9. The system of claim 1 wherein said control arrangement is connected to a vacuum sensor for sensing a vacuum level in said milking equipment, and said control arrangement is adapted to determine whether the detachment is a normal detachment or an abnormal detachment depending on said sensed vacuum level.

10. The system of claim 1 wherein an abnormal detachment is recognized by said control arrangement as being a detachment occurring prior to the end of milking, wherein the detached teat cup should be re-attached to the teat for further milking of that teat.

11. The system of claim 1 wherein said fluid delivery arrangement contains two valves connected in series to provide a failsafe delivery arrangement in order to prevent applying said fluid if one of the two valves fails.

12. A milking system comprising, for each of a plurality of milking positions, the fluid application system of claim 1, milking equipment, wherein said control arrangement comprises a first controller for controlling the applicators and a second controller for controlling the milking equipment, said first and second controllers being separated from one another.

13. The milking system of claim 12 wherein, for each of the plurality of milking positions, the second controller is provided for notifying the first controller of the milking equipment about a detachment determined as an abnormal detachment.

14. The milking system of claim 12 wherein, for each of the plurality of milking positions, the first or second controller is provided for notifying a dairy farmer about a detachment determined as an abnormal detachment.

15. A milking system comprising a plurality of milking positions each of said positions being provided with the fluid application system of claim 1 having milking equipment, wherein said control arrangement for each of said fluid application systems is provided for controlling the milking equipment.

* * * * *